June 20, 1967     H. E. GOINGS     3,326,446
CAR SEAT TRAY
Filed June 7, 1965     3 Sheets-Sheet 1
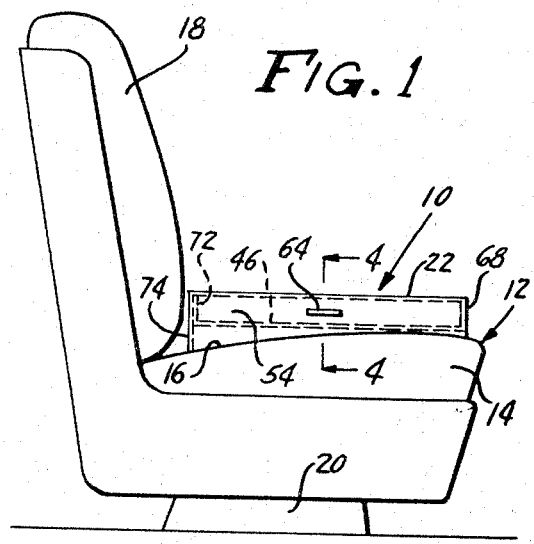
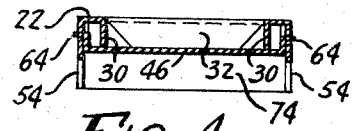
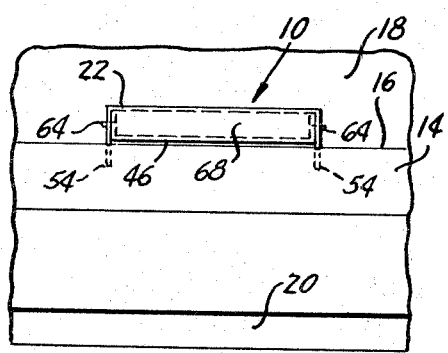
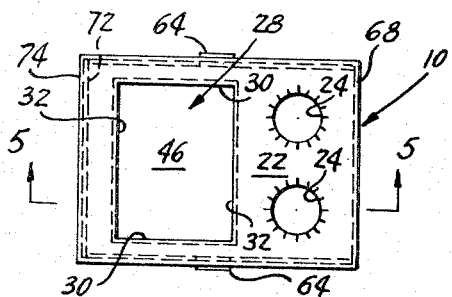
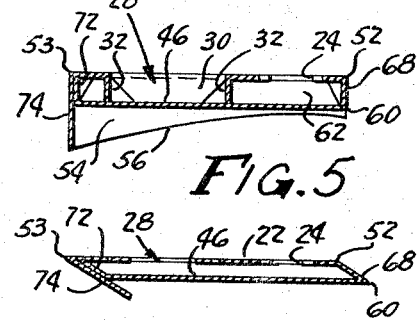
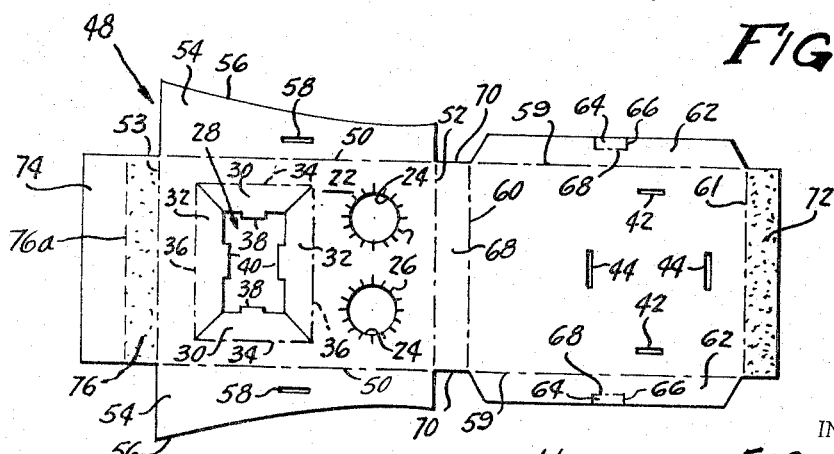
INVENTOR.
HARFORD E. GOINGS
BY *Kimmel, Crowell & Weaver*
ATTORNEYS.

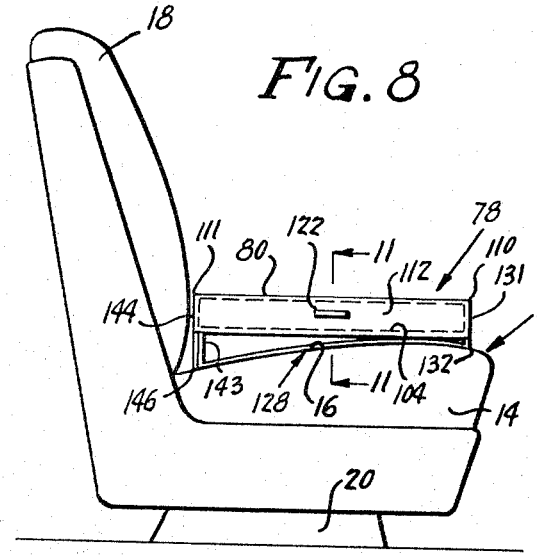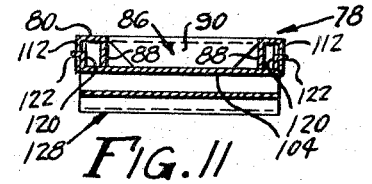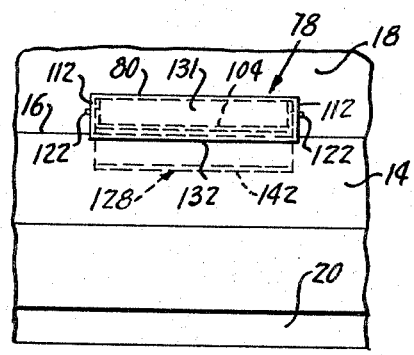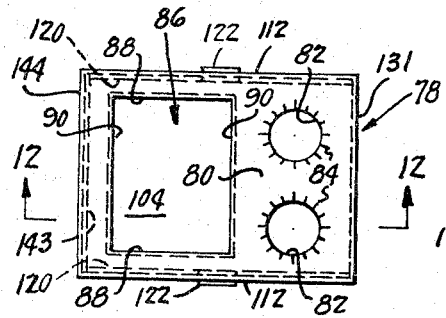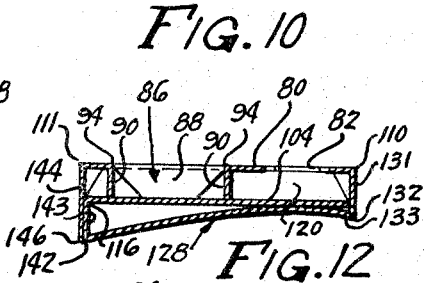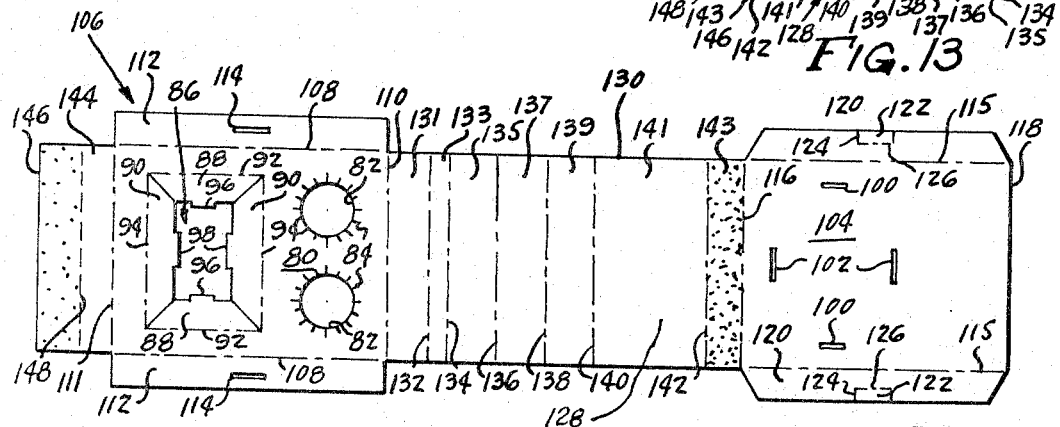

June 20, 1967  H. E. GOINGS  3,326,446
CAR SEAT TRAY

Filed June 7, 1965  3 Sheets-Sheet 3

INVENTOR.
HARFORD E. GOINGS

BY Kimmel, Crowell & Weaver
ATTORNEYS.

United States Patent Office 3,326,446
Patented June 20, 1967

3,326,446
CAR SEAT TRAY
Harford E. Goings, 5428 Center Drive SE.,
Washington, D.C. 20031
Filed June 7, 1965, Ser. No. 461,815
14 Claims. (Cl. 229—28)

This invention relates to car seat trays, and more particularly to a car seat tray generally of the type disclosed in my co-pending application Ser. No. 458,961, filed May 26, 1965.

In this aforementioned application, a receptacle, is disclosed which is assembled by the user from a single sheet of foldable material, such as cardboard or fiber-board. Although the car seat tray of the aforementioned application performs all of its desired functions in an acceptable manner, it has been found that an undue amount of time and effort is required by a user to assemble the same. Since it is contemplated that the trays of the aforementioned application and this application will be utilized extensively by high volume drive-in restaurants, it has been found necessary to provide a car seat tray which may be readily assembled by a restaurant employee with a minimum of time and effort expended.

It is a primary object of the instant invention to provide a car seat tray having an under surface contoured to the configuration of an automobile seat so as to maintain food or beverages in a level, readily accessible position and requires a minimum of time and effort of the user to assemble.

Another object of this invention is to provide a car seat tray which is constructed of a single sheet of foldable material.

Another object of this invention is to provide a car seat tray made of a single sheet of foldable material which may be partially assembled before delivery to the ultimate user.

A further object of the instant invention is to provide a car seat tray of the type previously mentioned which may be partially assembled during manufacture such that the ultimate user will merely "square" the delivered device and engage at least one tongue in a co-mating or complementary slot.

A more specific object of the instant invention is to provide a car seat tray having an arcuate undersurface when assembled having strategically located adhesive areas which may be adhesively secured together during manufacture and before delivery to a drive-in restaurant or the like.

Still another object of the instant invention is to provide a device of this character which is sturdy and durable in construction, reliable and efficient in use, and inexpensive to manufacture, assemble, and utilize.

Another object of the instant invention is to provide a car seat tray which is primarily adapted for placement on the upper surface of an automobile seat, but which may be manipulated by the user such that it will provide an upper horizontal surface when positioned on a horizontal plane.

A still further object of the instant invention is to provide a car seat tray which is primarily adapted for placement on the upper surface of an automobile seat, but which may be manipulated by the user such that a secondary supporting area will be created so that the tray may be positioned upon the thighs of a seated individual and yet maintain a substantially horizontal upper surface.

Other objects and advantages of the instant invention reside in the combinations of elements, arrangement of parts, and features of construction and utilization, all as will be more fully pointed out hereinafter and disclosed in the accompanying drawings wherein there are shown preferred embodiments of this inventive concept.

In the drawings:

FIGURE 1 is a side elevational view of one form of car seat tray embodying the instant inventive concept shown in position on the seat of a motor vehicle;

FIGURE 2 is a top plan view of the car seat tray of FIGURE 1 removed from the car seat;

FIGURE 3 is a front elevational view of the tray of FIGURE 1 shown in position on the car seat, portions of the latter being broken away, and certain concealed parts of the former being indicated in dotted lines;

FIGURE 4 is a transverse cross-sectional view taken substantially along line 4—4 of FIGURE 1 as viewed in the direction of the arrows;

FIGURE 5 is a longitudinal cross-sectional view taken substantially along line 5—5 of FIGURE 2 as viewed in the direction of the arrows;

FIGURE 6 is a longitudinal cross-sectional view similar to FIGURE 5 but before the tray is finally assembled;

FIGURE 7 is a top plan view of a blank of material from which the car seat tray of FIGURES 1 to 6 is formed, shown prior to folding and partial assembly;

FIGURE 8 is a side elevational view of another form of car seat tray embodying the instant inventive concept shown in position on the seat of a motor vehicle, certain concealed parts thereof being indicated in dotted lines;

FIGURE 9 is a top plan view of the car seat tray of FIGURE 8 when removed from the automobile seat;

FIGURE 10 is a front elevational view of the car seat tray of FIGURE 8 shown in position on the automobile seat, portions of the seat being broken away for clarity of illustrations;

FIGURE 11 is a transverse cross-sectional view of FIGURE 1, taken substantially along line 11—11 and viewing in the direction of the arrows;

FIGURE 12 is a longitudinal cross-sectional view taken substantially along line 12—12 of FIGURE 9 as viewed in the direction of the arrows;

FIGURE 13 is a longitudinal cross-sectional view similar to FIGURE 12 but taken before the tray is finally assembled;

FIGURE 14 is a top plan view of a blank of material from which the car seat tray of FIGURES 8 to 13 is formed, shown prior to folding;

Figure 15:
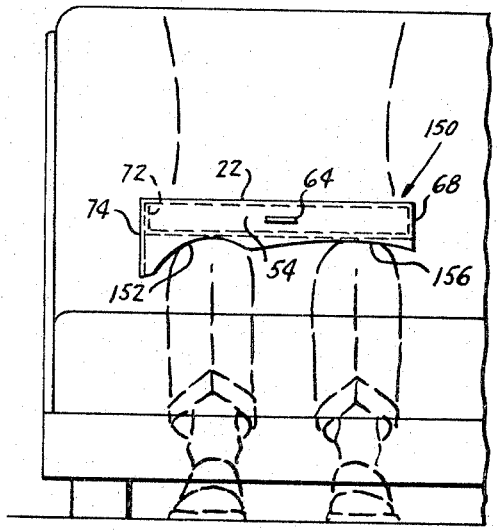
FIGURE 15 is a front elevational view of another form of car seat tray embodying the instant inventive concept shown in position on the thighs of a seated individual, certain parts of the car seat being broken away for clarity of illustration.

Referring now to the drawings in detail, wherein like reference characters designate like elements throughout the several views thereof, and particularly to FIGURES 1 to 7 inclusive, there is indicated generally at 10 a car seat tray constructed in accordance with the instant invention, positioned on the surface of a car seat generally indicated at 12 and including a seat cushion 14 having a generally arcuate upper surface 16 of conventional configuration, and a back cushion 18. Seat 12 is provided with a conventional supporting structure 20 and may comprise either the front or rear seat of an automobile or other vehicle.

Tray 10 consists essentially of an upper surface 22 which is provided with a plurality of circular openings 24 equipped with a plurality of radial severance lines 26 such that openings 24 are adapted for the reception of cups or bottles containing beverages or the like with radial serrations 26 providing quasi-resilient gripping means therefor. A preferably rectangular opening shown generally at 28 is provided in top wall 22 for the reception of food, such as sandwiches, either on plates or in packages, or the like, and includes normally depending side and end walls 30, 32 respectively, which fold downwardly about the periphery of opening 28 along a plurality of fold lines 34, 36. Side and end walls 30, 32 are each provided with a locking tab 38, 40 which engages a complementary shaped slot 42, 44 of a bottom wall member 46, which in the assembled position, is arranged to extend in a horizontal position substantially parallel to and underlie top wall 22 as shown in FIGURES 4 and 5.

As more fully explained hereinafter, one of the steps of assembling car seat tray 10 is the engagement of tabs 38, 40 in elongated slots 42, 44, which not only enhances the rigidity of the formed receptacle, but which also provides enlarged opening 28 for the reception of food or the like with beverage cups being readily insertable into openings 24.

Referring now to FIGURE 7, which discloses a blank of material indicated generally at 48 which is manipulated to form car seat tray 10, and which may be cardboard, fiber-board, heavy paper, or any other foldable material, it will be seen that top wall 22 is defined by a pair of scored side fold lines 50 and a pair of similarly scored end fold lines 52, 53. Extending transversely from side fold lines 50 are a pair of side wall portions 54 which form an outer or bottom edge 56 of arcuate configuration which conforms generally to the conventional contour of a vehicle seat to provide a support means for tray 10. The rear portions of side walls 54 are of substantially greater extent or height than the forward portion, so that when tray 10 is assembled, bottom wall 46 and top wall 22 will be maintained in a substantially level horizontal position. Each of side wall portions 54 has formed therein an elongated slot 58 as more fully explained hereinafter.

Bottom wall 46 is defined by a pair of side fold lines 59 and a pair of end fold lines 60, 61. Extending transversely from side fold lines 59 is a pair of side walls 62 each of which has formed therein a tab 64 made by a pair of transverse parallel severance lines 66 and a longitudinal score line 68 intersecting severance lines 66 for purposes more fully explained hereinafter. Connecting top wall 22 and bottom wall 46 together is a front panel 68 having side walls 70 co-linear with fold lines 50, 59. Extending longitudinally from fold lines 61 of bottom wall 46 is a rear tab or securing wall portion 72 having adhesive or the like preferably positioned on its upper surface. Extending longitudinally from fold line 53 of top wall 22 is a rear wall 74 having adhesive material 76 positioned between imaginary line 76a and score line 53.

It should be understood that blank 48 is pressed from a suitable piece of material by a stamping machine or the like with the appropriate quantities of adhesive applied at their respective locations by either a machine operated applicator or manually. After the application of adhesives, and usually at the location of a manufacturing plant, rear adhesive tab 72 will be folded along score line 61, bottom wall 46 will be folded along score line 60, top wall 22 will be folded along score lines 52, 53 such that adhesive tab 72 may be adhesively secured to the upper end of rear wall 74 as shown in FIGURES 5 and 6.

After the partial assembly steps previously mentioned, manufacturing blank 48 will appear in cross section as shown in FIGURE 6. It should be apparent that the device of FIGURE 6 may be further flattened to provide a readily storable, compact article which may be conveniently packaged with numerous similarly shaped articles for shipment to a drive-in restaurant or the like.

When it is desired to finally assembly car seat tray 10, it is necessary for the user to perform the following method. First, the user should "square" the collapsed package of FIGURE 6 by pressing on edges or fold lines 53, 60 and fold side and end walls 30, 32 downwardly such that tabs 38, 40 engage complementary shaped slots 42, 44. Next, side walls 62 should be folded upwardly along fold lines 59 with tab 64 then being folded outwardly as shown in FIGURE 4. The last step is to fold side wall portions 54 of top wall 22 along score lines 50 and engage slots 58 with tabs 64.

The assembled tray is now ready for use, and may either be loaded at a remote station and carried by a waiter to patrons seated in a vehicle or the purchased commodities may be placed in openings 24, 28 and handed to a patron who may then take the foodstuffs to his waiting vehicle.

Referring now to FIGURES 8 to 14 inclusive, there is a modified form of car seat tray shown generally at 78 positioned on the surface of a car seat indicated generally at 12 and including a seat cushion 14 having a generally arcuate top surface 16 of conventional configuration and a back cushion 18 with a suitable supporting device 20 supporting seat 12, all as previously explained.

In general, tray 78 differs from tray 10 in providing a single undersurface having a plurality of transverse score lines which adapt the undersurface of tray 78 to the convex surface of car seat 12 rather than providing a pair of vertically depending slides or runners so configured.

Car seat tray 78 includes a top surface 80 which is provided with a plurality of circular openings 82 having radial severance lines 84 similar to openings 24 and severance lines 26 of car seat tray 10. A generally rectangular opening shown generally at 86 is provided in top wall 80 as previously explained, and includes a pair of normally depending side walls 88 and a pair of end walls 90 which fold downwardly about the perimeter of opening 86 along fold lines 92, 94. Side and end walls 88, 90 are provided with a locking tab 96, 98 which engages a series of complementary shaped slots 100, 102 formed in a bottom wall member 104 which, in the assembled position is arranged to extend in a horizontal position substantially parallel to top wall 16 as shown in FIGURES 11 and 12.

It should be apparent that opening 86, side and end walls 88, 90 and bottom wall 104 cooperate to provide a receptacle for foods while openings 82 and bottom wall 104 cooperate to provide a receptacle for beverage cups or the like.

Referring now particularly to FIGURE 14, which discloses a blank of material shown generally at 106, which may likewise be of cardboard, fiber-board or heavy paper, it will be seen that top wall 80 is defined by a pair of scored side fold lines 108 and a pair of similarly scored end fold lines 110, 111. Transversely extending from side fold lines 108 are a pair of side wall portions 112, each of which form an elongated slot 114 for purposes more fully explained hereinafter.

Bottom wall 104 is defined by a pair of side score hold lines 115, a single end fold line 116 and terminal edge 118. Transversely extending from side fold lines 115 is a pair of side walls 120 forming a tab 122 by a pair of transverse severance lines 124 and longitudinal score line 126. As more fully explained hereinafter tab 122 is configured to reside in elongated slot 114 for purposes of making car seat tray 78 a rigid unit.

Connecting score line 110 of top wall 80 to score line 116 of bottom wall 104 is a strip of material indicated generally at 128 having side edges 130 which are preferably co-linear with score lines 108 and 115, and providing the support means for tray 78. Strip 128 is provided with a plurality of transverse score lines 132, 134, 136, 138, 140, and 142 thus creating a front wall portion 131, a plurality of supporting panels 133, 135, 137, 139, 141, and a securing portion 43 such that strip 128 may be conveniently configured to conform to the upper surface of car seat 12 as shown in FIGURE 8. That portion of strip of material 128 lying between score line 142 and score line 116 is covered with an appropriate amount of suitable adhesive material to provide in part a means for partially assembling car seat tray 78 during manufacture.

Extending longitudinally of score line 111 of top wall 80 is a rear wall portion 144 having adhesive material affixed on the under side thereof from terminal edge 146 to a central line 148.

Blank 106 will preferably be formed by a stamping machine from a larger piece of material with adhesive material being applied as previously mentioned either by a mechanical device or manually. At the place of manufacture, strip of material 128 will be folded downwardly with respect to top wall 80 along fold line 110, sections 133, 135 will be folded along score line 134 and adhesive section 143 will be folded along lines 142, 116 so that bottom wall 104 underlies top wall 80 as shown in FIGURE 13. Rear wall 144 will be folded downwardly along score line 111 so that the adhesive section bounded by lines 146, 148 will adhere to adhesive section 143. The partially assembled seat tray of FIGURE 13 may be further collapsed since top wall 80, and sections 135, 137, 139, 141 form essentially two legs of a parallelogram with side 144 and sections 131, 133 forming the other legs thereof. Accordingly, the partially assembled seat tray may be packaged with numerous other identical articles for shipment to a distributor or mass user.

When it is desired to finally assemble car seat tray 78, it is first necessary to "square" the partially collapsed article shown in FIGURE 13 by pressing on the corners shown at 111, 134. Since fold line 132 is above corner or fold line 134, differential movement between sections 131, 133 will result, thus placing section 133 beneath bottom wall 104 as shown in FIGURE 12. The next step of assembling will be to fold side and end walls 88, 90 downwardly so that tabs 96, 98 engage slots 100, 102 of bottom wall 104. The last required step is to fold side walls 120 upwardly and side wall portions 112 downwardly and engage tabs 122 in slots 114 of side wall portions 112 as shown in FIGURE 11. Car seat tray 78 may then be filled with appropriate foodstuffs for patrons as previously indicated.

Referring now to FIGURES 15 to 19 inclusive, there is indicated generally at 150 another form of car seat tray constructed in accordance with the principles of the instant invention, positioned on the thighs or lap of a seated individual. As more fully explained hereinafter, car seat tray 150 is quite similar to car seat tray 10, identical reference characters being used to designate identical parts.

The first difference between car seat trays 10 and 150 resides in the provision of a pair of arcuate perforated lines 152 on the outer edge of side wall portion 54 to provide for the ready removal of a cut-away portion or removable means 154. It should be noted that the innermost edge of cut-away portion 154 is aligned with the innermost extent of arcuate configuration 56 of side wall 54 as indicated at 156.

Car seat tray 150 is assembled in a manner identical with that of tray 10 and absent the removal of cut-away portion 154, the assembly will be identical. By removing cut-away portions 154 a pair of transversely aligned concave indentations will be provided, which allow tray 150 to be placed upon the thighs of a seated individual as shown in FIGURE 15.

Figure 17:
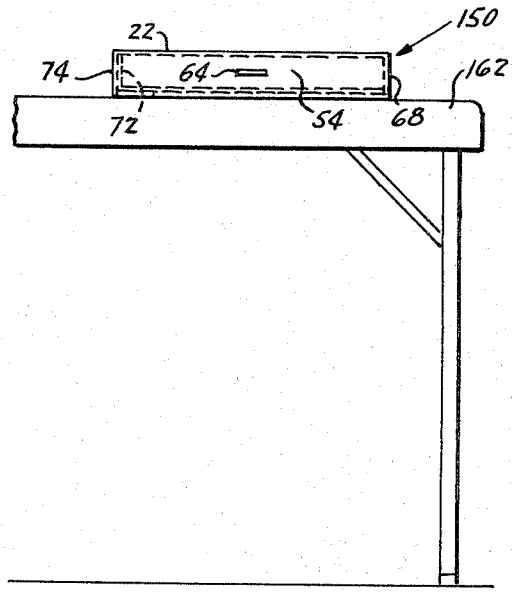
FIGURE 17 is a side elevational view of another form of tray embodying the instant inventive concept shown in position on a horizontal planar surface of a table.
Figure 16:
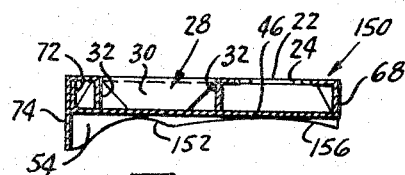
FIGURE 16 is a longitudinal cross-sectional view of the car seat tray of FIGURE 15.
Figure 18:
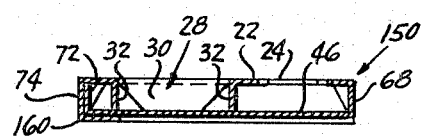
FIGURE 18 is a longitudinal cross-sectional view of the tray of FIGURE 17.
Figure 19:
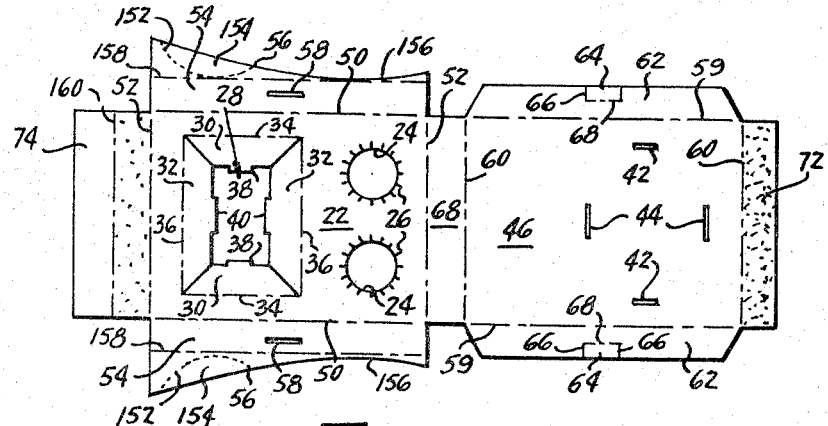
FIGURE 19 is a top plan view of a blank of material from which the car seat tray of FIGURES 15 and 16 and the tray of FIGURES 17 and 18 may be constructed.

The second difference between car seat trays 10 and 150 resides in the provision of a pair of longitudinal fold lines 158 positioned on side walls 54 co-linear with the terminal edges of side walls 62 of bottom wall 46. Cooperating with fold lines 158 as more fully explained hereinafter, is a transverse fold line 160 positioned on rear wall portion 74. It should be noted that fold line 160 is spaced from fold line 52 the same distance as fold lines 158 are spaced from fold lines 50. If it were desired to place tray 150 on a planar surface such as a table 162 as shown in FIGURE 17, rather than on the arcuate upper surface of an automobile seat, it is necessary only to fold rear walls 74 along fold line 160 as shown in FIGURE 18 and fold side wall portions 54 along fold lines 158 thus creating a flat-bottomed container.

In all other respects, including partial assembly during manufacturing, car seat tray 150 is identical with car seat tray 10 and is used in identical manners.

As used from time to time herein, the term "longitudinal" refers to the direction parallel to the long dimension of the tray or manufacturing blank whereas "transverse" refers to the short dimension of the tray or blank as may be seen in FIGURES 2, 7, 9, 14 or 19.

It is now seen that there is herein provided an improved car seat tray having all the advantages of this invention and others, including many advantages of great practical utility and commercial importance.

Since many embodiments may be made of the instant inventive concept, and since many modifications may be made of the embodiments hereinbefore shown and described, it is understood that the foregoing is to be interpreted as illustrative and not in a limiting sense.

I claim:

1. A car seat tray comprised of a single sheet of foldable material having two longitudinally spaced apart ends and formed to define a top wall adjacent one of said ends, said top wall having depending side wall portions, means forming article receiving openings in said top wall, said side wall portions having arcuately concaved lower edges to conform to the configuration of a vehicle seat, and a bottom wall adjacent the other of said ends extending intermediate said top wall and said lower edges of said depending side wall portions, said spaced apart ends being permanently secured together to form a continuous collapsible strip of material from said sheet of foldable material, said side wall portions each being provided with a longitudinal fold line extending the full length of said side wall portion and parallel to said bottom wall whereby said portions of said side walls may be removed flush with said bottom wall and said tray may be positioned on a planar surface.

2. A car seat tray comprised of a single sheet of foldable material having two longitudinally spaced apart ends and formed to define a top wall adjacent one of said ends, said top wall having depending side wall portions, means forming article receiving openings in said top wall, said side wall portions having arcuatly concaved lower edges to conform to the configuration of a vehicle seat, and a bottom wall adjacent the other of said ends extending intermediate said top wall and said lower edges of said depending side wall portions, said spaced apart ends being permanently secured together to form a continuous collapsible strip of material from said sheet of foldable material, each of said lower edges of said side wall portions having a large radius of curvature and being provided with a transversely aligned removable section to form an arcuately concave supporting edge having a small radius of curvature configured to conform to the thigh of a seated individual.

3. A car seat tray comprised of a single sheet of foldable material having two longitudinally spaced apart ends and formed to define a top wall adjacent one of said ends, said top wall having depending side wall portions, means forming article receiving openings in said top wall, said side wall portions having arcuately concaved lower edges to conform to the configuration of a vehicle seat, and a bottom wall adjacent the other of said ends extending intermediate said top wall and said lower edges of said depending side wall portions, said spaced apart ends being permanently secured together to form a continuous collapsible strip of material from said sheet of foldable material, a terminal area of said side wall portions adjacent one end of said tray being of lesser extent than a terminal area of said side wall portions adjacent the other end of said tray, said concavely arcuate lower edges connecting said areas of said side wall portions providing an intermediate area of said side wall portions of lesser extent than either of said terminal areas of said side wall portions, said intermediate area being located closer to said terminal area of lesser extent, each of said side wall portions being provided with a transversely aligned removable section positioned between said area of greater extent and said intermediate area to provide an arcuately concave supporting edge configured to conform to the thigh of a seated individual.

4. A car seat tray comprised of a sheet of foldable material having a top wall provided with article receiving openings therein, a bottom wall, end walls, and a supporting means contoured to define an arcuate support conforming in configuration to a car seat positioned beneath said bottom wall, and connected to said end walls, said supporting means comprising a sheet of material having a plurality of transverse fold lines.

5. A car seat tray comprised of a single sheet of foldable material having at least two spaced apart end walls forming securing portions, said sheet formed to define a top wall having article receiving openings therein, a bottom wall and a supporting means contoured to define an arcuate support conforming in configuration to a vehicle seat positioned beneath said bottom wall, said supporting means, said top wall and said securing portions being secured together to form a continuous strip of material, said supporting means comprising a portion of said continuous strip of material having a plurality of transverse fold lines.

6. A car seat tray comprised of a single sheet of foldable material having a top wall having article receiving openings therein, a depending rear wall extending from said top wall, a depending front wall extending from said top wall, an arcuately concave supporting surface having a plurality of transverse fold lines extending from said front wall and underlying said top wall, and a bottom wall extending from said supporting surface lying intermediate said top wall and said supporting surface, said rear wall being secured to the junction of said bottom wall and said supporting surface to define a continuous strip of material.

7. A car seat tray comprising a top wall having article receiving openings therein, end walls and a bottom wall, and depending side portions defining support means contoured to define arcuate supports conforming in configuration to a car seat extending below said bottom wall, said arcuate supports each including a removable portion which when removed defines a supplemental arcuate supporting means of lesser extent than said support means contoured to define a supplemental arcuate support conforming in configuration to the thigh of a seated individual.

8. A car seat tray comprising a top wall having article receiving openings therein and a pair of depending side walls, each of said side walls having two ends extending away from said top wall at different lengths and an arcuately concave lower edge connecting said ends, one of said side walls being the mirror image of the other, and a removable cut-out means on each of said side walls to provide an arcuately concave support contoured to conform to the thigh of a seated individual, said cutout-means being located adjacent said end of greater length.

9. A car seat tray comprising a top wall having article receiving openings therein, a bottom wall, and a pair of depending side walls, each of said side walls having an arcuate lower edge conforming to the configuration of a vehicle seat depending below said bottom wall, each of said side walls having a substantially straight score line extending adjacent to and substantially parallel to said bottom wall defining a removable section including the arcuate lower edge of said side walls, removable of which provides a substantially flat bottom tray adapted to be placed on a planar surface.

10. The structure of claim 9 wherein said score lines on said side walls are equally spaced from said top wall and said tray includes a depending rear wall having a score line spaced from said top wall the same distance as said side wall score lines are spaced from said top wall.

11. A blank for forming a car seat tray comprising a single sheet of foldable material stamped to define a top wall having openings therein, a rear wall portion extending from one end of said top wall portion and separated therefrom by a transverse fold line, a front wall portion extending from the other end of said top wall portion and separated therefrom by a transverse fold line, a bottom wall portion extending from said front wall portion and separated therefrom by a transverse fold line, a securing portion extending from said bottom wall portion opposite from said front wall portion and separated therefrom by a transverse fold line, a first side wall portion extending transversely from said top wall portion and separated therefrom by a longitudinal fold line and providing an arcuately concave outer edge and a second side wall portion extending transversely from said top wall portion and separated therefrom by a longitudinal fold line providing an arcuately concave outer edge, said second side wall portion being a mirror image of said first side wall portion.

12. The structure of claim 11 wherein said side wall portions are each provided with a longitudinal fold line spaced from said longitudinal fold line separating said side wall portion from said top wall portion, and said rear wall portion is provided with a transverse fold line spaced from said transverse fold line separating said top wall portion from said rear wall poertion.

13. The structure of claim 11 wherein each of said side wall portions has an arcuately concave serrated line providing a cut away portion in the configuration of a thigh of a seated individual, said side wall portions being mirror images of each other.

14. A blank for forming a car seat tray comprising a single sheet of foldable material stamped to define a top wall portion having openings therein, a rear wall portion extending from one end of said top wall portion and separated therefrom by a transverse score line, a front wall portion extending from the other end of said top wall portion and separated therefrom by a transverse score line, a bottom load supporting surface extending from said front wall portion and separated therefrom by a transverse score line and having a plurality of spaced transverse score lines to provide an arcuately concave surface conforming to the configuration of a vehicle seat, a securing portion extending from said bottom load supporting portion and separated therefrom by a transverse score line, and a bottom wall portion extending from said securing portion and separated therefrom by a transverse score line, said bottom wall portion having dimensions substantially equal to said top wall portion.

References Cited

UNITED STATES PATENTS

| | | | |
|---|---|---|---|
| 2,258,716 | 10/1941 | Ralph et al. | 206—72 X |
| 2,640,589 | 6/1953 | Foster et al. | |
| 2,670,260 | 2/1954 | Watt. | |
| 2,678,682 | 5/1954 | Thomas | 312—23 |
| 2,695,712 | 11/1954 | Kolander. | |
| 2,808,191 | 10/1957 | Cramer | 229—30 |
| 2,875,940 | 3/1959 | Dunn | 229—30 |
| 2,934,391 | 4/1960 | Bohnett | 312—23 |
| 3,140,035 | 7/1964 | Wenzel | 229—30 |
| 3,145,848 | 8/1964 | Wood | 206—72 X |

JOSEPH R. LECLAIR, *Primary Examiner.*

DAVIS T. MOORHEAD, *Examiner.*